United States Patent
Cheng et al.

(10) Patent No.: US 7,773,216 B2
(45) Date of Patent: Aug. 10, 2010

(54) COMPOSITE SHEET MATERIAL SELECTION METHOD FOR USE IN ULTRA-FAST LASER PATTERNING

(75) Inventors: Chen-Hsiung Cheng, Westford, MA (US); Xinbing Liu, Acton, MA (US)

(73) Assignee: Panasonic Corporation, Osaka (JP)

( * ) Notice: Subject to any disclaimer, the term of this patent is extended or adjusted under 35 U.S.C. 154(b) by 935 days.

(21) Appl. No.: 11/579,521

(22) PCT Filed: May 10, 2005

(86) PCT No.: PCT/US2005/016224

§ 371 (c)(1),
(2), (4) Date: Nov. 3, 2006

(87) PCT Pub. No.: WO2005/111728

PCT Pub. Date: Nov. 24, 2005

(65) Prior Publication Data

US 2008/0291451 A1    Nov. 27, 2008

Related U.S. Application Data

(60) Provisional application No. 60/569,757, filed on May 10, 2004.

(51) Int. Cl.
G01J 3/00    (2006.01)
(52) U.S. Cl. .................................................. 356/300
(58) Field of Classification Search .................. 356/433; 438/795–799
See application file for complete search history.

(56) References Cited

U.S. PATENT DOCUMENTS

| | | | |
|---|---|---|---|
| 4,684,437 A | 8/1987 | Donelon et al. | |
| 4,756,765 A | 7/1988 | Woodroffe | |
| 5,208,437 A | 5/1993 | Miyauchi et al. | |
| 5,688,551 A | 11/1997 | Littman et al. | |
| 6,146,715 A | 11/2000 | Kim et al. | |
| 6,522,066 B2 | 2/2003 | Sheu et al. | |
| 6,946,394 B2 * | 9/2005 | Fielden et al. | 438/680 |
| 2003/0092267 A1 * | 5/2003 | Kian et al. | 438/690 |
| 2003/0143326 A1 | 7/2003 | Bubb et al. | |
| 2004/0161695 A1 | 8/2004 | Boroson et al. | |

* cited by examiner

Primary Examiner—Tarifur Chowdhury
Assistant Examiner—Abdullahi Nur
(74) Attorney, Agent, or Firm—Harness, Dickey & Pierce, P.L.C.

(57) ABSTRACT

The present invention is a method of selecting composite sheet materials for use in ultra-fast laser patterning of layers of organic thin film material such as OLEDs. The material is selected to accomplish patterning of upper layers without damaging underlying layers by using an ultra-fast laser programmed with the appropriate laser processing parameters. These parameters are derived by examining each layer's absorption spectra, thermal, and chemical characteristics. The method of the present invention includes measuring each layer's absorption spectrum, examining each layer's thermal and chemical characteristics, determining if the layer is ablatable, determining the laser setup, patterning the layer through laser ablation processing, and determining if more layers need to be ablated. Further, the method includes a sub-method of selecting an alternate material if a layer's material characteristics are not favorable for ablation without damaging underlying layers.

40 Claims, 12 Drawing Sheets

COMPOSITE SHEET MATERIAL SELECTION METHOD FOR USE IN ULTRA-FAST LASER PATTERNING

FIELD OF THE INVENTION

The present invention relates to differentially patterning layers of organic thin film material without damaging underlying layers. More particularly, the present invention provides methods to ablate patterns on multi-layered thin organic structures, such as organic light emitting diodes (OLEDs), using ultra-fast lasers and absorption spectroscopy without damaging underlying layers. Further, the present invention provides a method of optimally selecting material for patterning for constructing an organic structure such as an organic light emitting diode (OLED), using ultra-fast lasers and absorption spectroscopy without damaging underlying layers.

BACKGROUND OF THE INVENTION

Yearly market projections for electronic display devices over the next five to ten years are in the tens of billions of dollars, with $20 billion anticipated in liquid crystal display (LCD) sales alone. In the same timeframe, it is expected that the market for Organic Light Emitting Diodes (OLEDs) will be in the range of $700 million to $3 billion annually.

OLEDs are generally anticipated to overtake LCDs as the preferred display technology. This is expected because OLEDs enjoy a number of practical advantages over LCDs. Some of the most significant advantages include: 1) OLEDs project a brighter image that can be viewed from wider angles; 2) OLEDs do not require the backlight required in LCDs, which lowers the cost of manufacturing, increases reliability of performance, and improves the image intensity range, contrast, and consistency over the viewing area; 3) OLEDs require less power for equivalent image quality; 4) OLEDs are projected to be less expensive to manufacture, requiring fewer materials and roughly half the number of manufacturing steps; 5) OLEDs are designed to have a longer lifetime based on power requirements; and 6) OLEDs produce a wider spectrum of colors.

As a result, manufacturing OLEDs has become an emerging field of interest. As part of the OLED manufacturing process, circuitry such as thin-film transistors (TFTs) is built on the OLED device to drive the OLED, similar to other display devices. Patterning layers of organic thin film material is one of the specific manufacturing needs to accomplish this. Although the semiconductor industry has developed photolithography and etching methods for silicon wafers, these semiconductor-based methods are not viable for patterning organic materials because (1) the chemistries may be damaging to the organic materials, (2) OLEDs cannot be subjected to semiconductor vacuum processes, and/or (3) the variety of chemistries required for multiple layers may be too expensive to use, or moreover, may not exist. This is particularly true when the substrate in consideration consists of many thin layers of different types of materials. Therefore there exists a need for methods that support fabrication processes and standards for next generation organic electronic devices, for example for flexible displays.

A method of patterning organic layers on a multi-layered structure using multiple chemistry processes is found in U.S. Pat. No. 6,080,529A, entitled, "A Method Of Etching Patterned Layers Useful As Masking During Subsequent Etching Or For Damascene Structures." However, using multiple chemistries for patterning multi-layered material both adds process steps, and is expensive. In addition, a specific chemistry is selected to be effective on a specific material, and lacks versatility across multiple layers and substrates. Thus this approach both reduces the overall profitability for manufacturing the device and the ability to use the approach on other materials. Therefore there is a need to provide a method of patterning thin film material that does not require multiple and costly semiconductor etches and pattern chemistries to achieve ablation. Further there is a need to provide a method of patterning thin film material that is more versatile than conventional methods.

A method of fabricating an electroluminescent (EL) display is found in U.S. Patent Application 20030186078, entitled "Red-Green-Blue (RGB) Patterning Of Organic Light-Emitting Devices Using Photo-Bleachable Emitters Dispersed In A Common Host." The '078 patent describes a method of fabricating organic EL displays with simplified light emitting device (LED) structures. One embodiment of the '078 patent uses a laser ablation technique to ablate away undesired organic and electrode layers patterning discrete RGB pixels adjacent to each other on the same substrate. However, the '078 patent fails to alleviate some problems with laser ablation techniques on organic thin films. For example, underlying layers are often damaged during laser ablation of multi-layered organic thin films, especially when the layer thickness approaches the laser wavelength. The confocal parameter (i.e. depth of focus) determines the extent in the direction of beam propagation where the focused laser beam is the most intensive. Due to the diffraction limit, the confocal parameter can not be less than 0.78 times the laser's wavelength (0.78λ) while the smallest possible beam size is 0.5λ. All the material, within 0.78λ of the focus will experience approximately the same laser intensity if the strong absorption is absent. It is particularly true when the top layer is to be ablated away, and the underlying layer will be fully exposed during the process. Note, strong absorption is defined as the outermost layer absorbing greater than 50% of the transmitted laser beam's energy. Also, focus is defined as the focal point of the laser beam.

Therefore, there exists a need to pattern multi-layered organic thin films without damaging underlying layers.

It is therefore an object of the invention to provide methods that support fabrication processes and standards for next generation organic electronic devices.

It is another object of the invention to provide a method of patterning multi-layered organic thin films that does not require multiple and costly semiconductor etch and pattern chemistries to achieve ablation.

It is another object of the invention to provide a method of patterning thin film material that is more versatile than conventional methods.

It is yet another object of this invention to provide a method of patterning multi-layered organic thin films without damaging underlying layers.

SUMMARY OF THE INVENTION

The present invention is a method of selecting composite sheet materials for use in ultra-fast laser patterning of layers of organic thin film material such as OLEDs. The material is selected to accomplish patterning of upper layers without damaging underlying layers by using an ultra-fast laser programmed with the appropriate laser processing parameters. These parameters are derived by examining each layer's absorption spectra, thermal, and chemical characteristics. The method of the present invention includes, for example, measuring each layer's absorption spectrum, examining each layer's thermal and chemical characteristics, determining if the layer is ablatable, determining the laser setup, patterning the layer through laser ablation processing, and determining if more layers need to be ablated. Further, the method includes a sub-method of selecting an alternate material if a layers material characteristics are not favorable for ablation without damaging underlying layers.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

The present invention is a method of differentially patterning layers of organic thin film material without damaging underlying layers. More specifically, the invention is a method of patterning layers of organic thin film material such as OLEDs without damaging underlying layers by using an ultra-fast laser programmed with the appropriate wavelength ($\lambda$), pulse width ($\tau$), spectral width ($\Delta\lambda$), spot size, bite size and fluence, all derived from examining each layer's thermal, strength and absorption spectra. The method of the present invention includes the steps of examining each layer's thermal and chemical characteristics, measuring each layer's absorption spectrum, determining if the layer is ablatable, determining the laser setup, patterning the layer through laser ablation processing and determining if more layers need to be ablated.

Note, $\lambda$ is defined as the laser beam wavelength typically measured in nanometers (nm); $\tau$ is defined as the temporal extent of a single laser pulse measured in pico-seconds (ps); $\Delta\lambda$ is defined as a measure of the wavelength extent of a spectrum; spot size is defined as the laser beam's diameter on target typically measured in microns ($\mu m$); bite size is defined as the distance increment of laser's strike points in between adjacent pulses measured in microns ($\mu m$); and fluence is defined as the laser's pulse energy per unit area delivered on target in Joules per square centimeter ($J/cm^2$).

Figure 1:
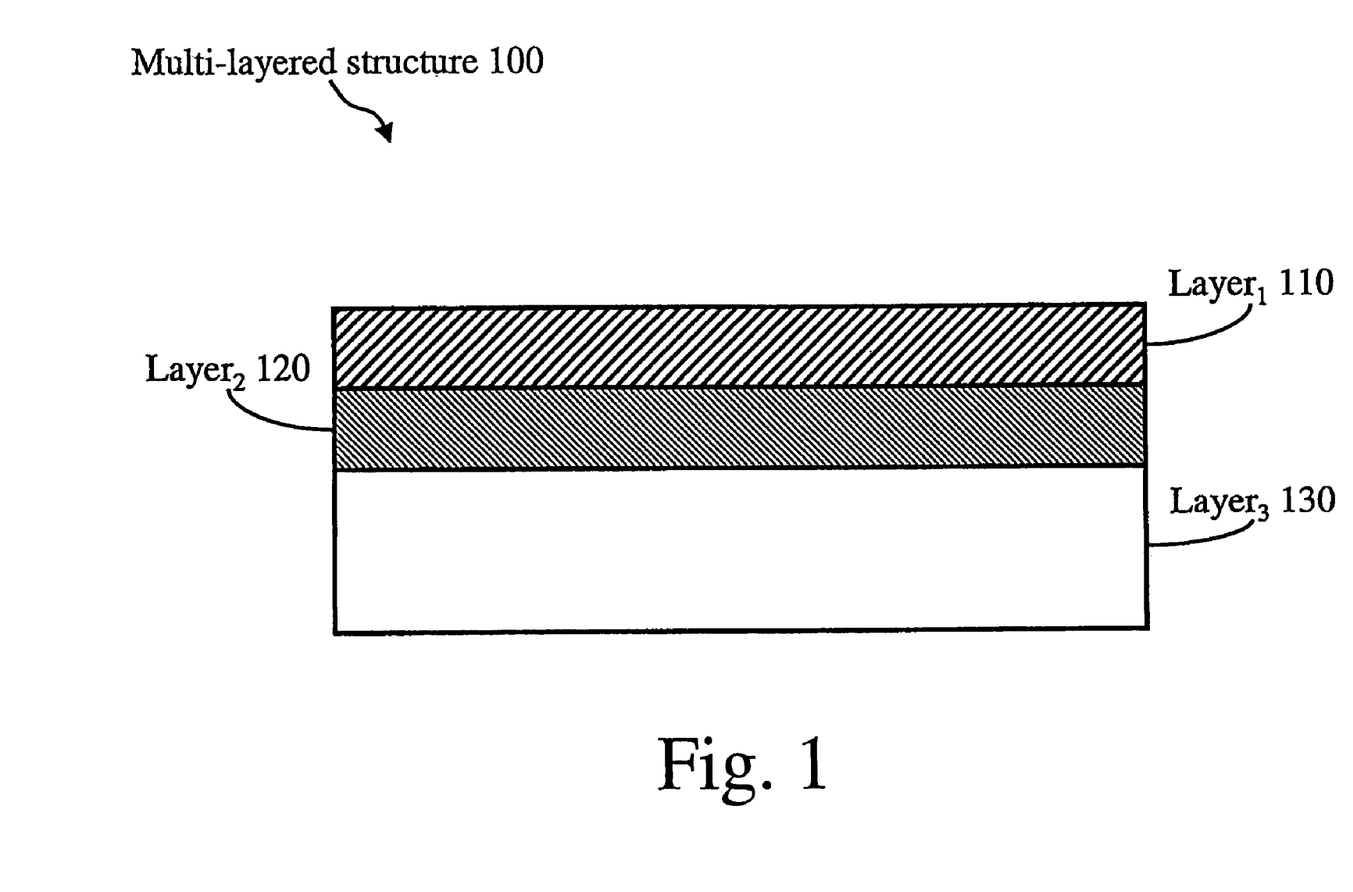
FIG. 1 illustrates a thin multi-layered structure with the top layer being a thin organic film such as that used in an OLED display.

FIG. 1 illustrates a hypothetical multi-layered structure 100, which contains previously formed thin-film layers: layer$_1$ 110, layer$_2$ 120, and layer$_3$ 130. Specifically, at least one of the layers: 110, 120 or 130 is an organic thin film layer, such as that used in an OLED display. Note that, as long as one or more of the layers to be patterned is an organic thin film, that multi-layered structure 100 may have any number of layers, and is not limited to the three layers. Layer$_1$ 110, layer$_2$ 120, and layer$_3$ 130 are used for the hypothetical absorption spectra plots 300 and 400.

Figure 2:
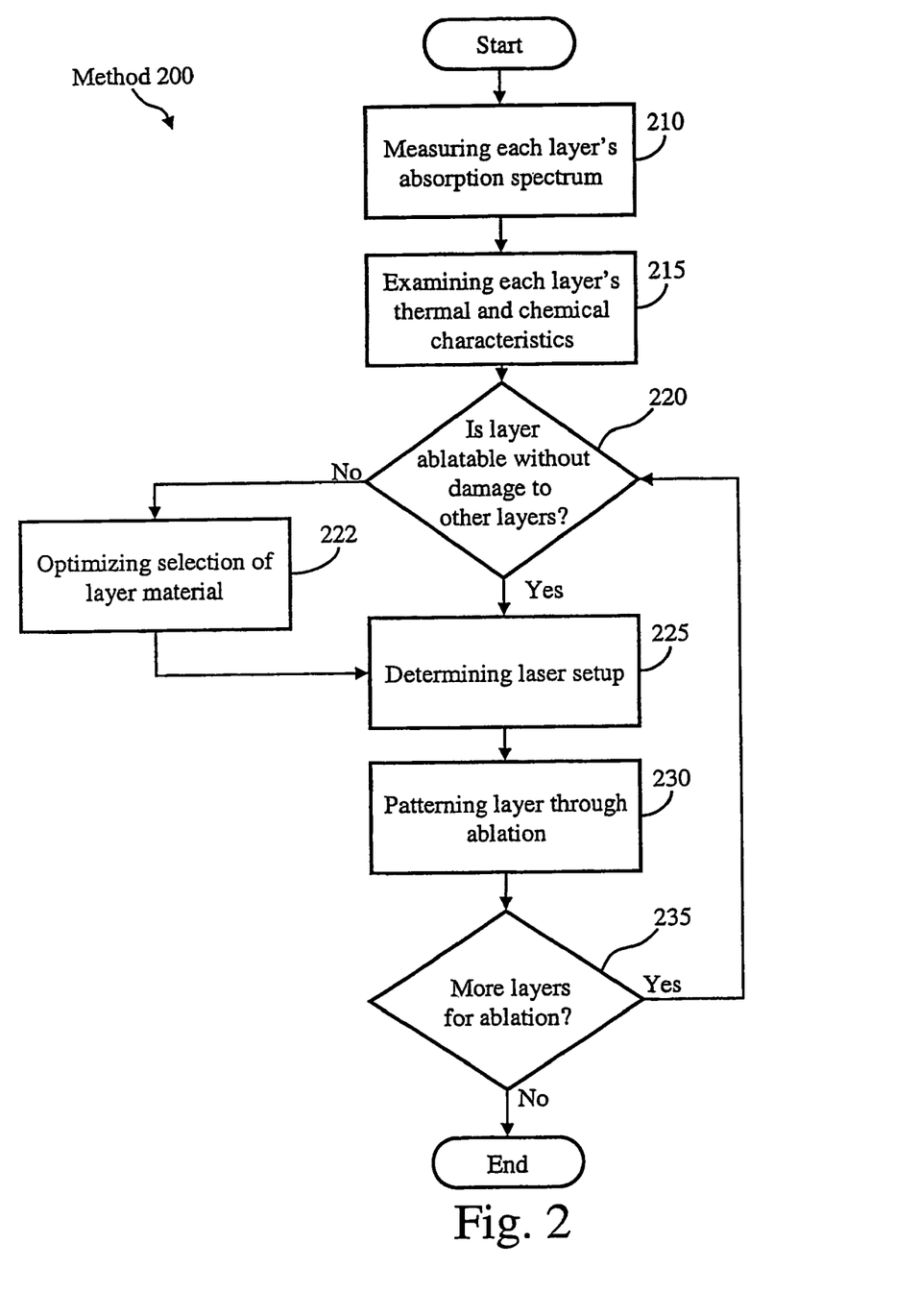
FIG. 2 illustrates a flow diagram of a method of providing a differentially patterned organic thin film top layer of a multi-layered structure without any damaged underlying layers.
Figure 3:
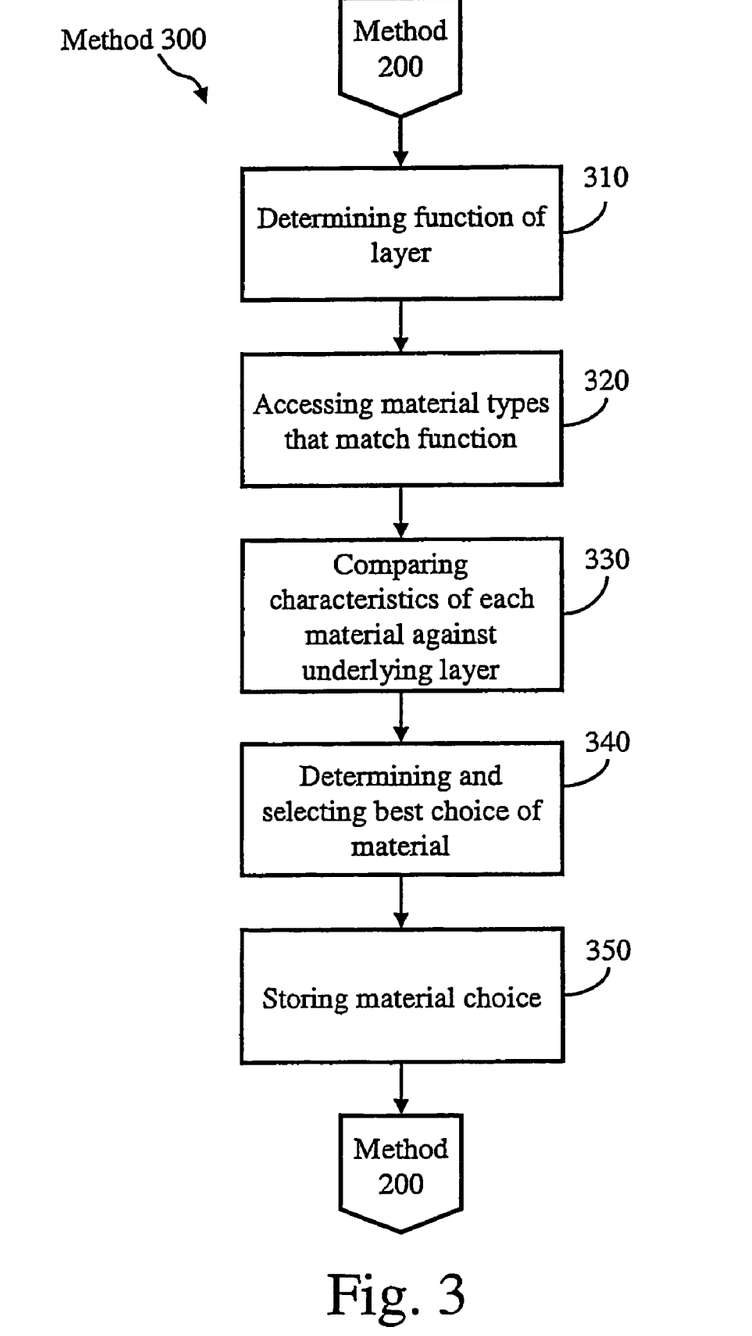
FIG. 3 illustrates a flow diagram of a method of optimizing the material selected for a layer of the multi-layered structure.

FIG. 2 illustrates a flow diagram of a method 200 of differentially patterning an organic thin film top layer of a multi-layered structure without damaging underlying layers, with specific reference to FIG. 1, multi-layered structure 100, layer$_1$ 110, layer$_2$ 120, and layer$_3$ 130. A sub-method 300 for optimally selecting layer material is illustrated in FIG. 3. Method 200 includes the steps of:

Step 210: Measuring Each Layers Absorption Spectrum

In this step, each layer's absorption spectrum is measured, for example, by a spectrometer or by a LUT.

Figure 4:
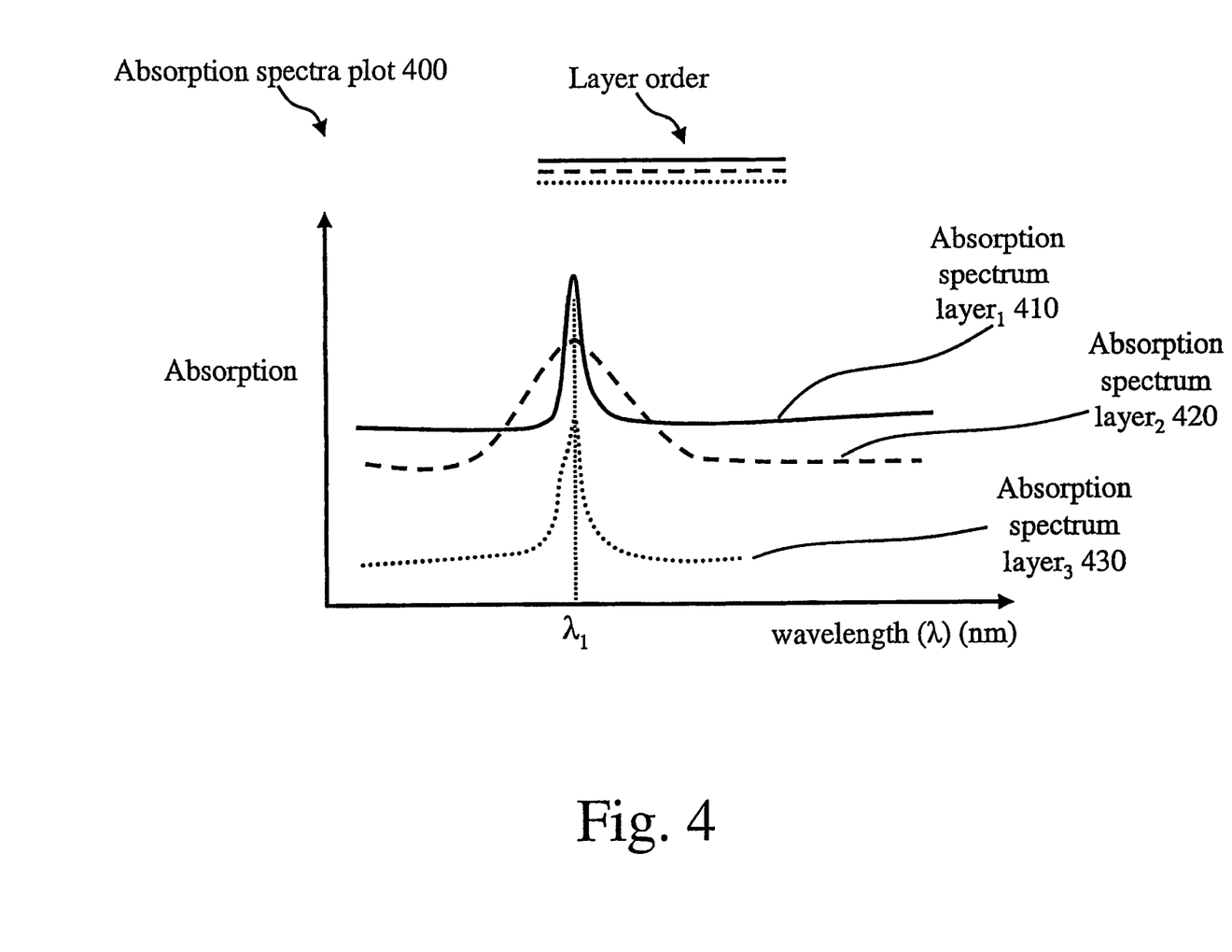
FIG. 4 illustrates hypothetical absorption spectra measurements plot where the resonant peaks significantly overlap.
Figure 5:
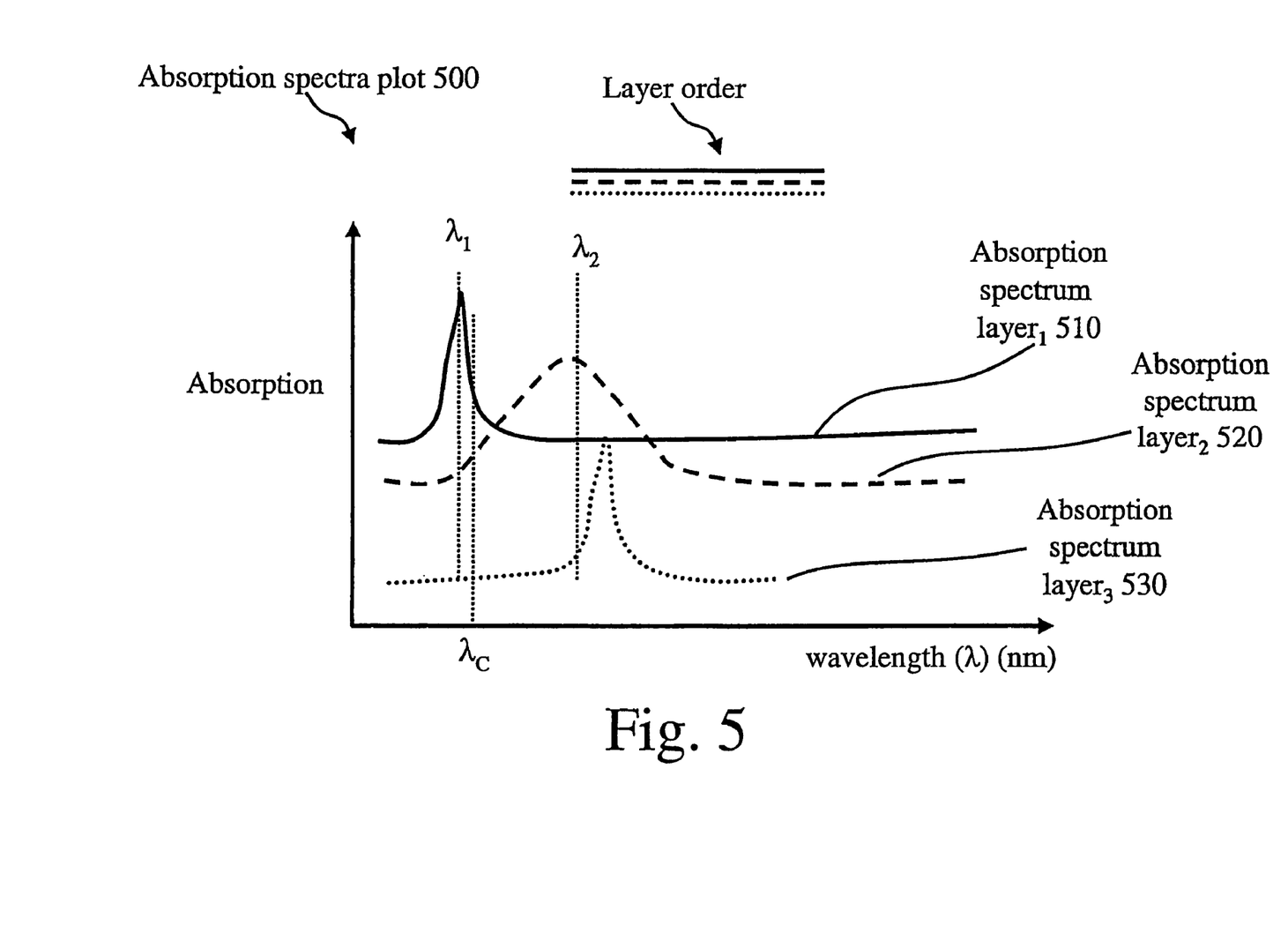
FIG. 5 illustrates hypothetical absorption spectra measurements plot where the resonant peaks do not significantly overlap.

FIGS. 4, 5 illustrate measurement hypothetical examples of multi-layered absorption spectra plots 400, 500 respectively. The absorption spectra layer$_1$ 410 and 510, absorption spectra layer$_2$ 420 and 520 and absorption spectra layer$_3$ 430 and 530 are absorption spectra measurements on multi-layered structure 100 layer$_1$ 110, layer$_2$ 120 and layer$_3$ 130 respectively.

FIG. 4 illustrates an example absorption spectra plot 400 where the absorption strengths are very similar and the resonant peaks significantly overlap. The y-axis, labeled absorption, represents the amount of light energy absorbed per unit material thickness and the x-axis, labeled wavelength ($\lambda$), represents the light $\lambda$ in nm. Note, the delivered energy from the ablating laser equals one, (i.e. 100% of effective delivered energy), which represents the sum of the absorbed energy, reflected, and pass through energy. The pass through energy is energy that is transmitted through the layer to the underlying layers. Also, the total absorption energy equals the sum of the absorbed energy for absorption spectrum layer$_1$ 410 absorption spectrum layer$_2$ 420 and absorption spectrum layer$_3$ 430 (hereafter layer$_1$ 410, layer$_2$ 420, and layer$_3$ 430.) Ideally, all of the delivered energy from laser can only be absorbed by the desired layer for ablation. This is not the case for FIG. 4. This will be further explained in step 220.

The absorption spectra are the most critical factor in determining the ablatability of the uppermost layer$_1$ 410 without damage to the underlying layer$_2$ 420 and layer$_3$ 430; however, the other factors of thermal and chemical characteristics must still be considered in support (or not) of the wavelength selected for ablation.

FIG. 5 illustrates an example absorption spectra plot 500 where absorption difference is significant and the resonant peaks do not significantly overlap. Likewise to absorption spectra plot 400, the y-axis represents the amount of light energy absorbed and the x-axis represents the light λ in nm. This more ideal case will be further explained in step 220.

Figure 6:
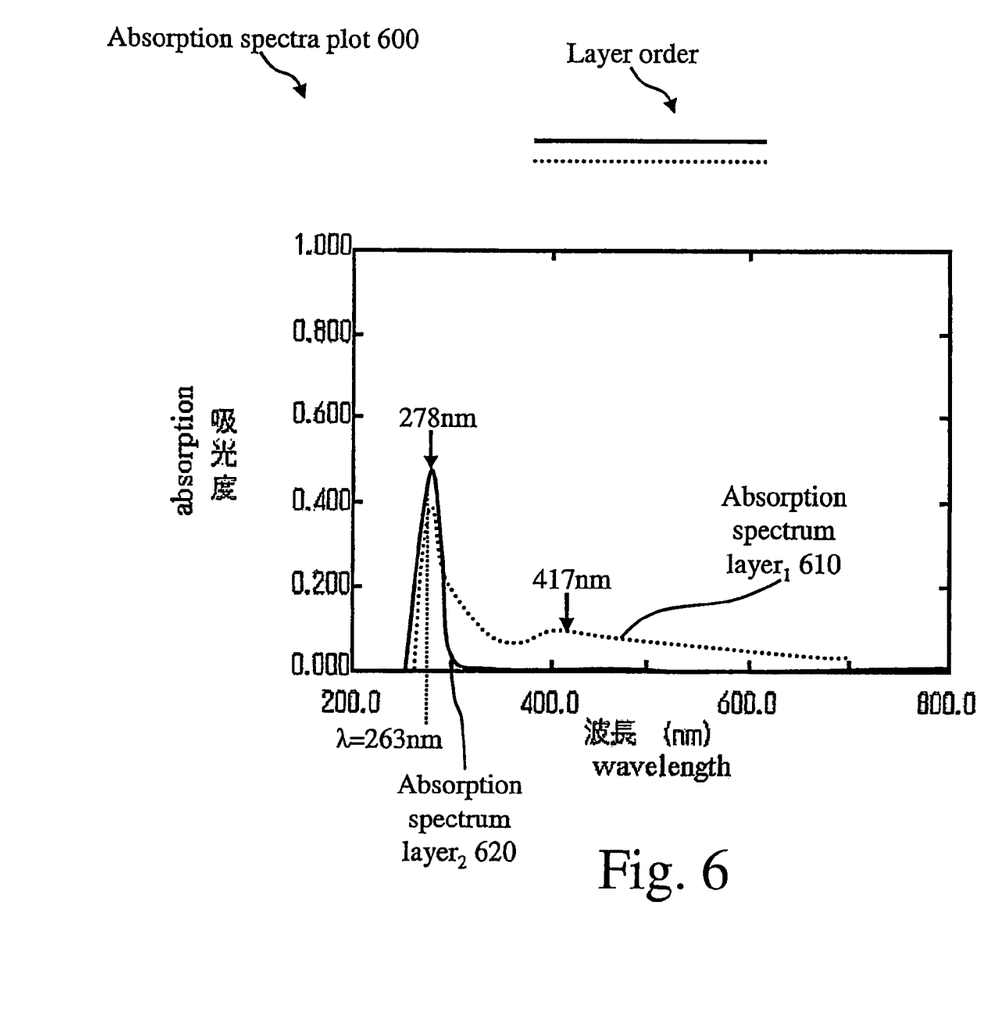
FIG. 6 illustrates laboratory absorption spectra measurement data plot from a spectrometer model UV-2400PC by Shimadzu Corporation where the device under test is a layered polyvinylphenol material.

FIG. 6 illustrates data from laboratory absorption spectra plot 600 from a spectrometer model UV-2400PC by Shimadzu Corporation where the device under test (DUT) is a layered polyvinylphenol (PVPh) material. Absorption spectrum $layer_1$ 610, from the outermost layer, is for a coating that has 5% concentration of PVPh in solvent before spin coating. Absorption spectrum $layer_2$ 620, is for a coating that has 3% concentration of PVPh in solvent before spin coating.

The absorption spectra are used as data inputs for the ablatable decision in step 220 and for determining the laser setup in step 225. Method 200 proceeds to step 215. As illustrated in FIG. 6, the absorption spectra have significant differences caused by material preparation.

Step 215: Examining Each Layer's Thermal and Chemical Characteristics

In this step, the thermal and chemical characteristics of the material contained in $layer_1$ 110, $layer_2$ 120, and $layer_3$ 130 are examined. For example, each layer's melting point, thermal conductivity, bonding strength to the underlying layer may be found in a previously-constructed look up table (LUT, as shown in example Table 1 below). These characteristics are used as data inputs for decision step 220 and for determining the laser setup in step 225. For example, a layer with a low thermal conductivity would require less power and exposure time than a layer with a higher thermal conductivity with equal absorption strength, melting point and bonding.

TABLE 1

Example thermal and chemical characteristics

| Layer | Thermal conductivity | Melting Point | Bonding strength |
|---|---|---|---|
| Layer 1 | 0.087 watt/cm · K | 1900° C. | Moderate |
| Layer 2 | 3.17 watt/cm · K | 1064° C. | Moderate |
| Layer 3 | 3.85 watt/cm · K | 1083° C. | Moderate |

Method 200 proceeds to step 220.

Step 220: Is the Layer Ablatable without Damage to Other Layers?

In this decision step, each layer's absorption spectrum, thermal, and bonding characteristics, from steps 210 and 215 respectively, are used to determine the whether the layer in question can be ablated without damage to other layers.

An example of failing case absorption spectra is illustrated in absorption spectra plot 400. This plot illustrates a fail, because the absorption strengths at the underlying resonant peaks in absorption spectrum $layer_2$ 420 and absorption spectrum $layer_3$ 430 are very similar to the absorption strength illustrated in absorption spectra $layer_1$'s 410 resonant peak. The underlying resonant peaks in absorption spectrum $layer_2$ 420 and absorption spectrum $layer_3$ 430 also significantly overlap the outermost layer's absorption spectrum $layer_1$'s 410 resonant peak.

If $layer_1$ 110 were to be patterned, the absorption spectra $layer_1$ 410, $layer_2$ 420, and $layer_3$ 430 show that the underlying $layer_2$ 120 and $layer_3$ 130 would be damaged by absorbing some of the laser's transmitted energy. This absorption by underlying layers is the most detrimental when the laser power is high enough to ablate deeper than the outermost layer and penetrate into the underlying layers. An example worst case scenario would occur if the $layer_1$ 110 were completely ablated away by overexposure thus damaging underlying $layer_2$ 120 and/or $layer_3$ 130.

If the layers' resonant peaks do not overlap, as illustrated in absorption spectra plot 500 then the $layer_1$ 110 is ablatable because most of the transmitted energy from the ablating laser will be absorbed in $layer_1$ 110 and not in the underlying $layer_2$ 120 and $layer_3$ 130.

Note that the wavelength difference in peak locations is not sufficient enough to justify the selection. Observing each layer's absorption strengths are also a factor in determining the ablatability of a layer. For example, if an outermost layer's absorption strength is 100% higher than its underlying layer the material is still ablatable even if the resonant peaks overlap.

Although the spectra comparison serves as the most significant role in evaluating the differential ablation, the thermal and chemical characteristics can be used as additional criteria. For example, an underlying layer with a very high melting point and/or very high thermal conductivity might not be damaged by ablation if the outer layer, to be ablated, had a low melting point and/or low thermal conductivity and/or moderate bonding to the underlying layer, even if in the situation illustrated in absorption spectra plot 400.

This decision block is evaluated by examining the results from both steps 210 and 215, and is further illustrated in Tables 2 and 3 below. Using layer information of resonant peak and other material characteristic data such as thermal and chemical characteristics, the difference between $layer_1$ 110 to be ablated and underlying $layer_2$ 120 and $layer_3$ 130 is calculated and the value assessed to determine whether $layer_1$ 110 can be safely ablated without damage to $layer_2$ 120 and $layer_3$ 130.

TABLE 2

Example of material characteristics used to assess ablatability

| Layer | Resonant Peak | Thermal conductivity | Melting Point |
|---|---|---|---|
| Layer 1 | 278 nm | 0.087 watt/cm · K | 350° C. |
| Layer 2 | <200 nm | 3.17 watt/cm · K | 1064° C. |
| Layer 3 | 500 nm | 0.008 watt/cm · K | 388° C. |

TABLE 3

Example of comparing characteristics and determining acceptable ablatabilty

| Layers Being Compared | Ratio in absorption strength at 263 nm | Ratio Thermal conductivity | Difference in Melting Point |
|---|---|---|---|
| Layer 1 and 2 | 10.0 | 0.027 | −714 |
| Layers 2 and 3 | 2.0 | 396 | 676 |

It has been empirically found that a factor of two in absorption strength is sufficient for differential ablation when the thermal and bonding properties are not dramatically detrimental, specifically when (1) the thermal conductivity of the uppermost layer is within a factor of 100 compared to the underlying layer (where the conductivity of the uppermost layer is greater), and/or (2) the melting point is within a differential of 500° C. (where the melting point of the underlying layer is lesser). When the absorption strengths are within 30% of each other, a 10 times higher thermal conductivity and/or 500° C. higher melting point are desired for the underlying layer than the layer to be ablated. Higher thermal conductivity will dissipate the heat faster and result in a lower equivalent temperature even when the same amount of energy is absorbed.

Many scenarios other than the above examples exist. These other scenarios may be evaluated by someone skilled in the art to determine the ablatability of the layer in question, for example by someone skilled in the art of optoelectronics and material science.

If the layer is not ablatable based on the above assessment, then method 200 proceeds to step 222; however if it is ablatable, then method 200 proceeds to step 225.

Step 222: Optimizing Selection of Material

In this step, an alternate is researched and selected such that multi-layered structure 100 of FIG. 1 can be redesigned for favorable ablation of layer₁ 110, without damage to underlying layers. For purposes of illustration, please refer to the "failing case" shown in FIG. 4, absorption spectra plot 400. In this situation, layer₁ 110 cannot be ablated without damaging layer₂ 120 underneath and thus an alternate material needs to be used in order to pattern layer₁ 110.

FIG. 3 illustrates a flow diagram of method 300, which includes the specific steps required to select optimal materials for a layer of multi-layered structure 100 upon failure of the existing material selections, with specific reference to layer₁ 110, layer₂ 120, and layer₃ 130 of FIG. 1. Method 300 includes the steps of:

Step 310: Determining Function of Layer

In this step, the function of the desired layer is determined, e.g. layer₁ 110, to be replaced in multi-layered structure 100. For example, the layer may be a passivation layer or a conductive layer, which determines the set of appropriate materials to consider. In this example, layer₁ 110 as shown in FIG. 4, having absorption spectra 410, needs to be replaced in order to determine a wavelength for ablation that does not damage underlying layers layer₂ 120 or layer₃ 130. For example, although aluminum may be the most desired material for conductor layer, one may have to use gold layer because gold has higher absorption than the aluminum at UV wavelength. Alternatively silver or copper can also be considered.

Step 320: Accessing Material Types that Match Function

In this step, the characteristics of materials that match the desired function from step 310 are accessed, for example through use of manual reference tables or electronic look-up tables. Please refer to Table 1 for examples of relevant material characteristics, including thermal conductivity, melting point, and bonding strength.

Table 4 below illustrates alternate material characteristics of materials having a like function (conductive layer). The differences in material characteristics such as wavelength of resonant peak, thermal conductivity and melting point provide options for choosing a layer 110 that is favorable for ablation without damage to underlying layers. Method 300 proceeds to step 330.

TABLE 4

Example of alternate layer material characteristics for possible selection of a conductive layer

| Layer | Layer Function | absorption Peak | Thermal conductivity | Melting Point |
|---|---|---|---|---|
| 1st Alternative Layer 1 | Conductive Layer(Al) | <185 nm | 2.36 watt/cm · K | 660° C. |

TABLE 4-continued

Example of alternate layer material characteristics for possible selection of a conductive layer

| Layer | Layer Function | absorption Peak | Thermal conductivity | Melting Point |
|---|---|---|---|---|
| 2nd Alternative Layer 1 | Conductive Layer(Ag) | <410 nm | 4.30 watt/cm · K | 962° C. |
| 3rd Alternative Layer 1 | Conductive Layer(Au) | <600 nm | 3.20 watt/cm · K | 1064° C. |

Step 330: Comparing Characteristics of Each Material Against Underlying Layer In this step, all the materials accessed in step 320 for 1st Alternative Layer 1, 2nd Alternative Layer 1, and 3rd Alternative Layer 1 (not shown) are compared with the underlying layer for best viability of ablation without damaging the existing underlying layers.

TABLE 5

Example of comparing characteristics and determining acceptable ablatabilty

| Layers Being Compared | Ratio in absorption strength at 263 nm | Ratio Thermal conductivity | Difference in Melting Point |
|---|---|---|---|
| 1st Alternate Layer 1 and 2 | 0.4 | 27.1 | −1240° C. |
| 2nd Alternative Layer 1 and 2 | 5 | 49.4 | −938° C. |
| 3rd Alternative Layer 1 and 2 | 5 | 36.8 | −836° C. |

As described above in step 220 of Method 200, the ratios of absorption strength, thermal conductivity and difference in melting point are used to select the best material for multi-layered structure 100 that allows ablation without damage to the underlying layer. This assessment can be repeated against other layers in multi-layered structure 100 to ensure all layers remain intact upon ablation. Method 300 proceeds to step 340.

Step 340: Determining and Selecting Best Choice of Material

In this step, the best choice of material is selected from steps 320 and 330 is for the replacement layer on multi-layered structure 100. Method 300 proceeds to step 350.

Step 350: Storing Layer Info

In this step, the material choice is stored for the given layer for future reference. For example, the material type, absorption spectrum, thermal and chemical characteristics are stored, (e.g. in a computer database or LUT). The data is stored for use in assembling multiple materials for multi-layered structure 100. Method 300 ends and returns to step 225 of Method 200.

Step 225: Determining Laser Setup

In this step, each layer's thermal, strength, rigidity and absorption spectrum characteristics, from steps 210 and 215 respectively, are used to select the operating parameters for the ablating laser (not shown). The laser's appropriate $\lambda$, $\tau$, $\Delta\lambda$, spot size, bite size and fluence, all derived from examining each layer's thermal, strength and absorption spectra are set.

It is also very important to empirically choose the proper power level for the ablating laser. Otherwise, an over-powered laser beam would destroy the substrate.

Reciprocally, the power level needs to be adjusted to achieve maximal processing speed for given allowable bite size. This procedure may need to be repeated for each layer to be ablated. For example, to differentially ablate layer$_1$ 110 and layer$_2$ 120 without damaging the layer$_3$ 130 for the case in absorption spectra plot 500 of FIG. 5, a non-tunable laser with a $\lambda=\lambda_c$ would be picked. On the other hand, to only ablate layer$_1$ 110 for the case in absorption spectra plot 500 of FIG. 5, a laser with a $\lambda=\lambda_1$ would be picked. In absorption spectra plot 600 of FIG. 6 a wavelength of $\lambda=263$ nm beam can be chosen. The ideal processing parameters are found to have a fluence of approximately 0.01 to 10 J/cm$^2$ depending on material, with a spot size of 3 µm, and a bite size of 0.3 µm.

Typically, lasers have only one $\lambda$, but in an alternate embodiment, a broadband tunable source such as an optical parametric oscillator (OPO) may be used to adjust the $\lambda$ to achieve the desired absorption strength difference at the specific layer interface sequentially and individually. For example, to differentially ablate layer$_1$ 110 and layer$_2$ 120 without damaging the layer$_3$ 130 for the case in absorption spectra plot 500 of FIG. 5, one would tune laser to $\lambda=\lambda 1$ to ablate layer$_1$ 510, and tune laser to $\lambda=\lambda 2$ to ablate layer$_2$ 520 after layer$_1$ 510 is patterned.

Thus this method provides versatility to a variety of materials where the ablating laser can be set to meet the specifications required of the particular arrangement of layers, for example in the multi-layer structure 100.

Method 200 then proceeds to step 230.

Step 230: Patterning Layer through Ablation

In this step, the layer is patterned through the known process of laser ablation. FIGS. 7 through 12 illustrate the effects of laser ablation in a variety of circumstances.

Figure 7:
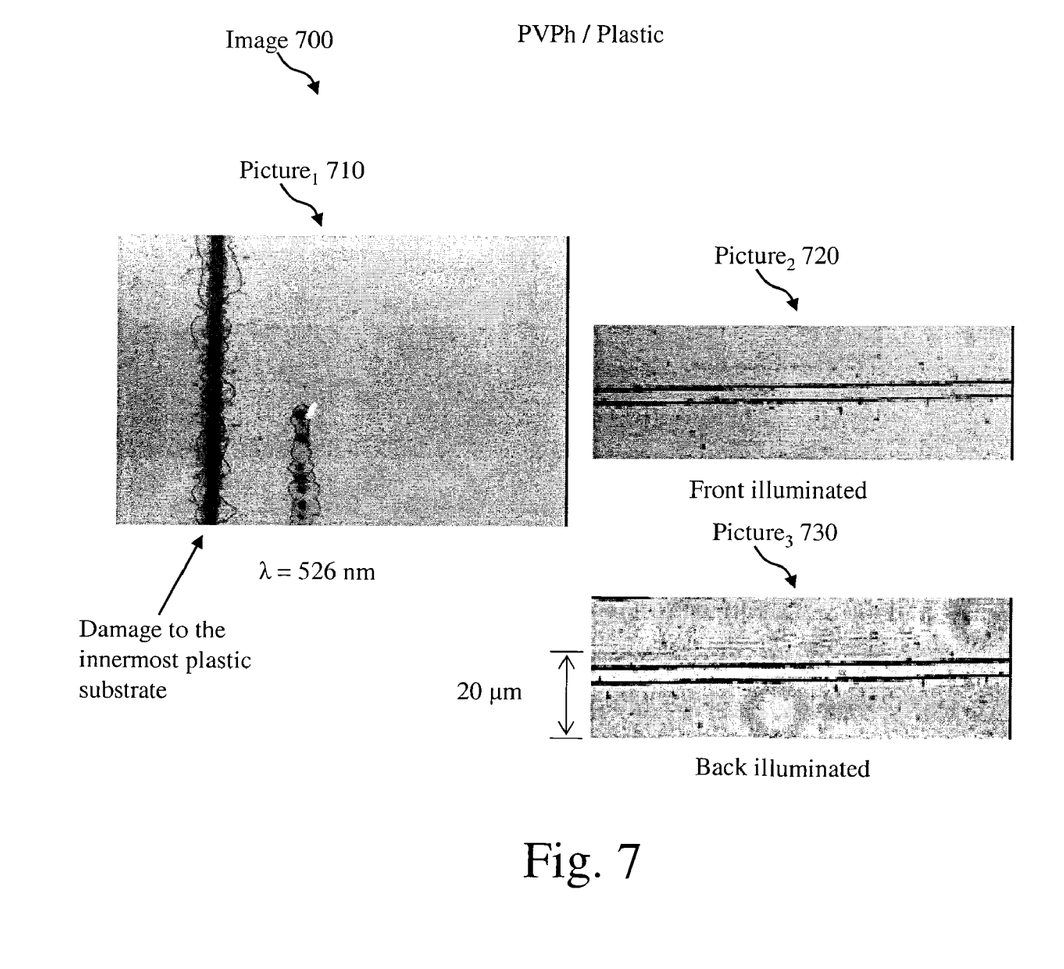
FIG. 7 illustrates a patterned two-layer PVPh/plastic material image.

FIG. 7 illustrates a patterned two-layer PVPh/plastic material image 700. Picture1 710 illustrates patterning by a $\lambda=526$ nm laser. The dark portion of picture1 710 and hair lines illustrate the damage to the innermost plastic substrate. Picture2 720 and picture3 730 are photographs of successful ablation patterning where the plastic substrates were not damaged. The ablation in the latter two was conducted with $\tau=20$ ps, $\lambda=263$ nm, spot size=2 µm, bite size=0.2 µm and fluence=0.3 J/cm$^2$.

Figure 8:
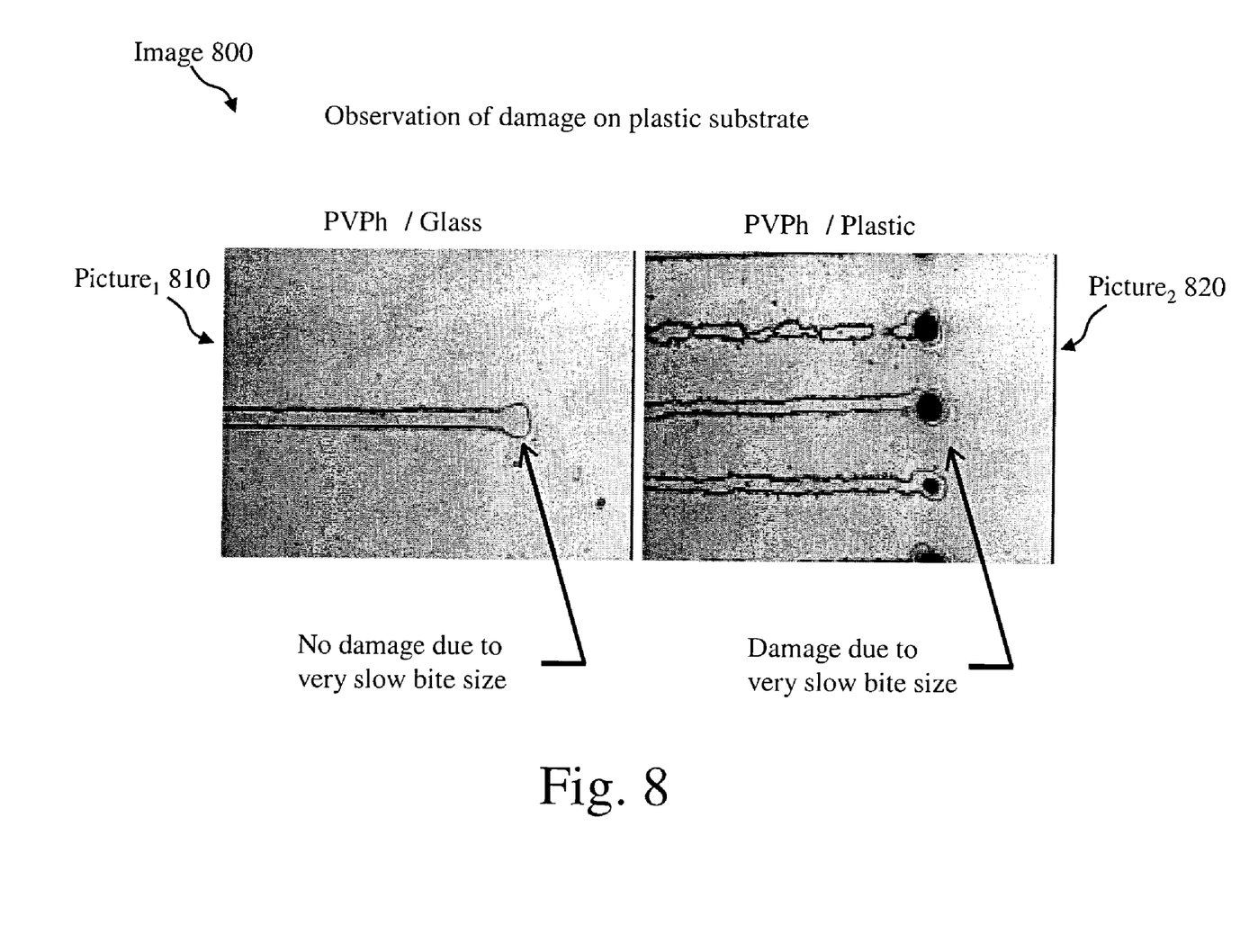
FIG. 8 illustrates bite size effects on multi-layered materials image.

FIG. 8 illustrates bite size effects on multi-layered materials image 800. The circular spots to the right of both picture1 810 and picture2 820 shows where zero bite size, i.e. no motion, occurred. A PVPh/glass layered material shows no damage even though the bite size equals zero in picture1 810. A PVPh/plastic layered material shows damages due to very small bite size in picture2 820. The damage threshold of glass is substantially higher than the plastic.

Figure 9:
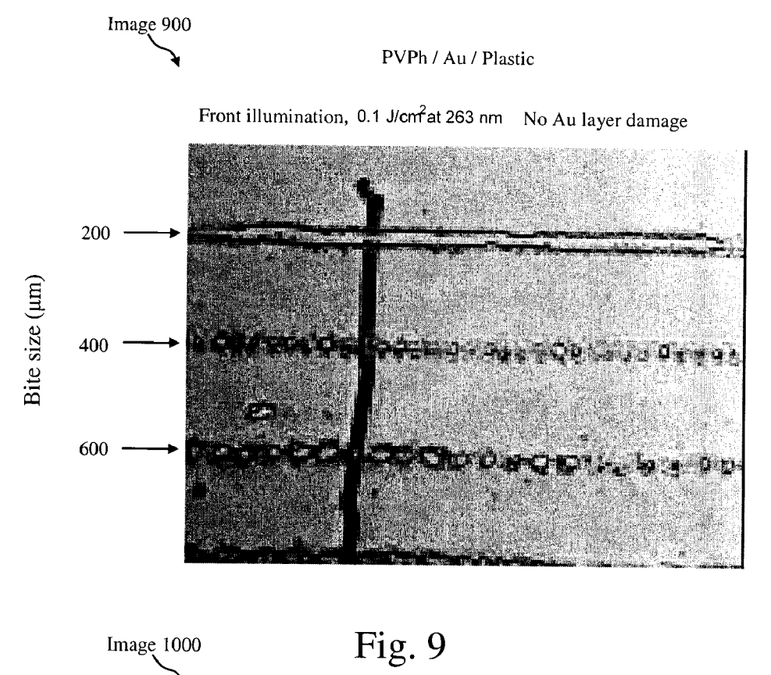
FIG. 9 illustrates bite size and fluence effects on a PVPh/gold (Au)/plastic layered material image.

FIG. 9 illustrates bite size and fluence effects on a PVPh/gold (Au)/plastic layered material image 900. The material was ablated at fluence=0.3 J/cm$^2$ with differing bite sizes. Quickening the motion and, therefore, increasing bite size decrease the ablation overlap. None of the bite size PVPh patterns damaged the Au film or the plastic below.

Figure 10:
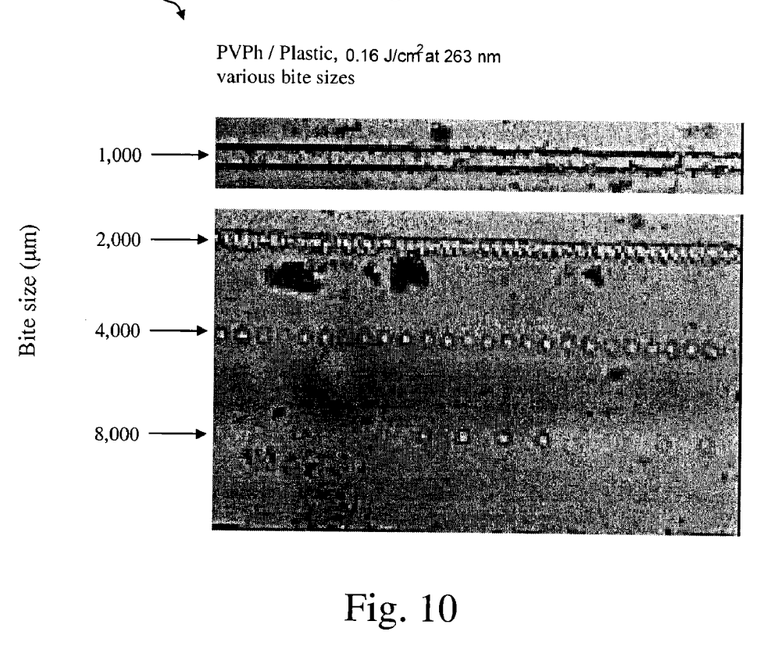
FIG. 10 illustrates bite size and fluence effects on a PVPh/plastic layered material image.

FIG. 10 illustrates bite size and fluence effects on a PVPh/plastic layered material image 1000. The material was ablated at $\lambda=263$ nm, spot size=2 µm, fluence=0.5 J/cm$^2$, and differing bite sizes. Again, increasing the bite size decreases the ablation overlap. Patterning with bite size=1.0 µm is well defined, but patterning with bite size=8.0 µm has poor coverage.

Figure 11:
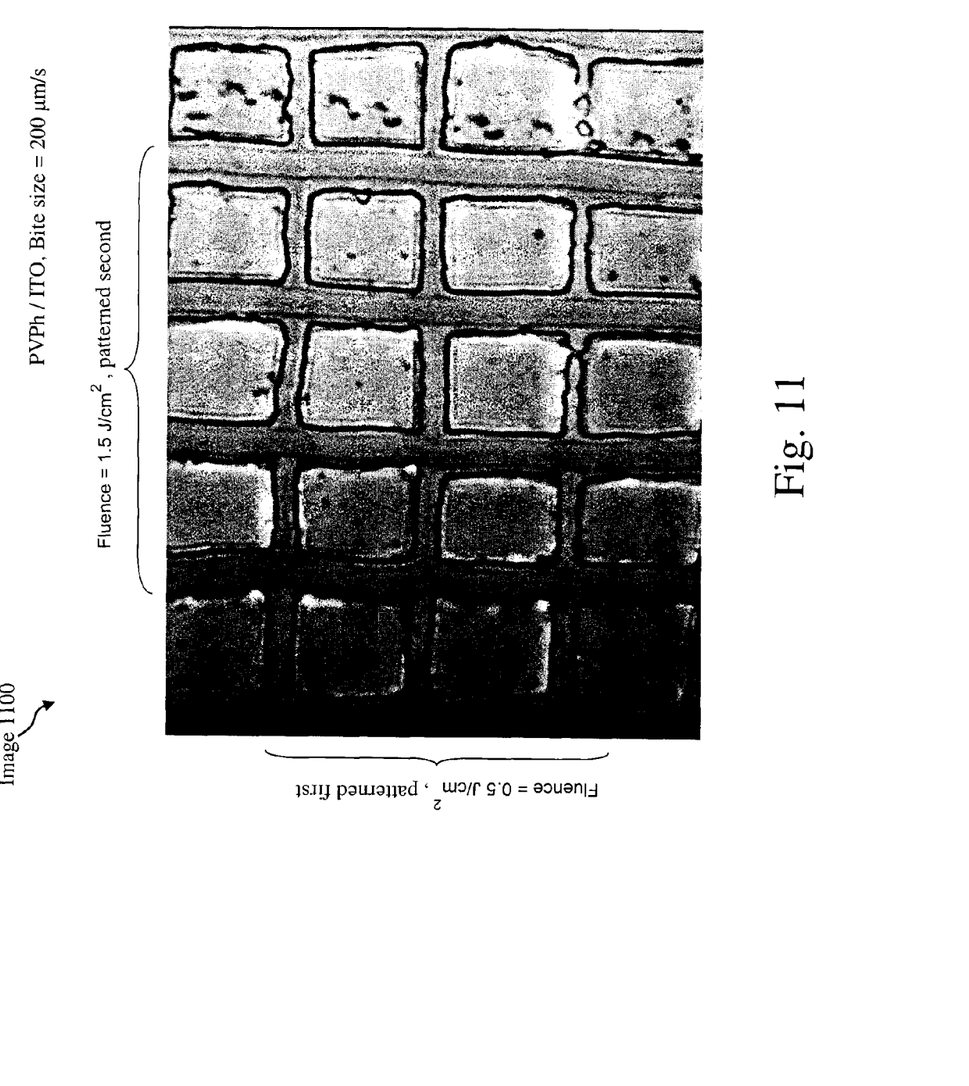
FIG. 11 illustrates patterning of PVPh/indium tin oxide (ITO) in the horizontal and vertical directions image.

FIG. 11 illustrates patterning of PVPh/indium tin oxide (ITO) in the horizontal and vertical directions image 1100. The material was ablated at $\lambda=263$ nm, spot size=2 µm, bite size=0.2 µm, vertical patterning having fluence=1.5 J/cm$^2$ and horizontal patterning having fluence=0.5 J/cm$^2$. Increasing the power deepened the ablation pattern into the ITO layer. On the other hand, the ITO under the PVPh was not damaged in the horizontal pattern using lower power. The thin vertical shadow lines indicate the edge of patterned ITO.

Figure 12:
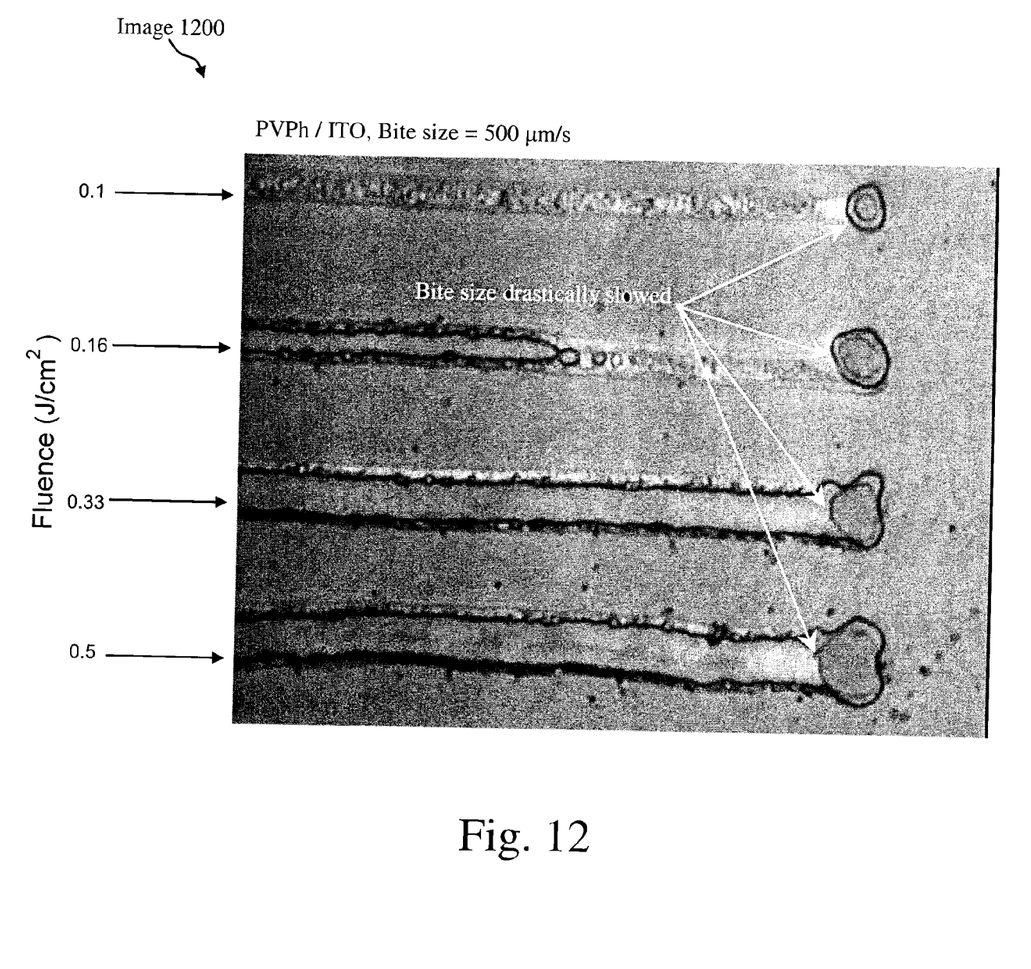
FIG. 12 illustrates power effects on a PVPh/ITO layered material image.

FIG. 12 illustrates power effects on a PVPh/ITO layered material image 1200. The material was ablated at $\lambda=263$ nm, spot size=2 µm, bite size=0.5 µm and differing fluence levels. The ablation was done left to right with a constant bite size until the rightmost edge where the bite size was brought to zero. The dark rings indicates the edge of ablated ITO layer. The ITO under the PVPh was not damaged until the bite size is reduced to zero.

Figure 13:
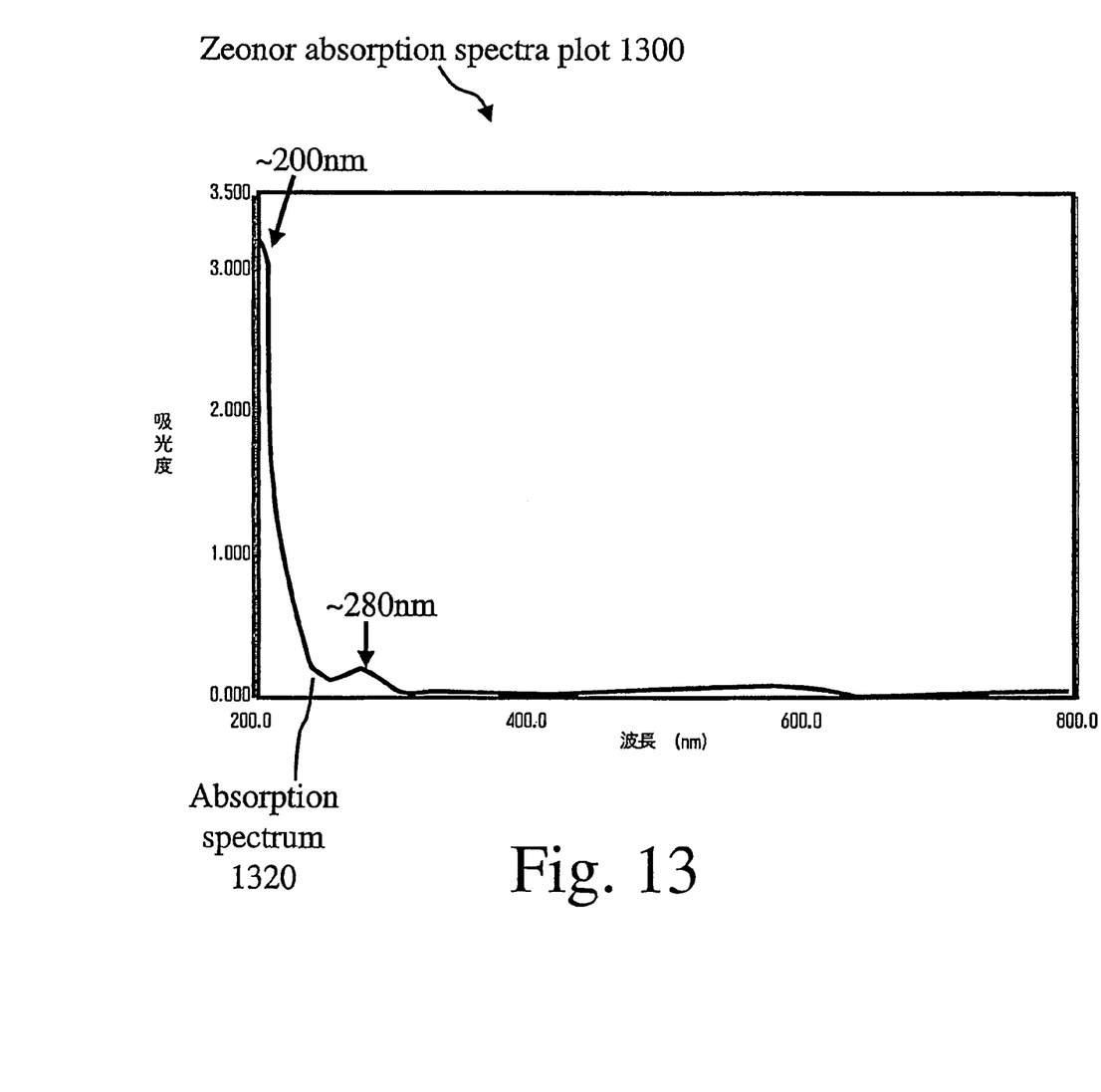
FIG. 13 illustrates absorption spectra measurements plot of the plastic substrate "Zeonor."

FIG. 13 illustrates a Zeonor absorption spectra plot 1300 of the plastic substrate "Zeonor," which has been used in laboratory testing of this method. Absorption spectrum 1320 exhibits a peak of wavelength $\lambda$ shorter than or approximately at 200 nm, and a smaller peak at approximately 280 nm. Comparing FIG. 13 with spectra of FIG. 6, the difference in laser absorption between the PVPh layer and the Zeonor substrate is evident.

Thus it is shown that, using this method, patterning of multi-layered organic thin films can be achieved without damage to underlying layers. In addition, expensive chemistries and add process steps are avoided.

Method 200 proceeds to step 235.

Step 235: More Layers for Ablation?

In this decision step, it is determined if there are more underlying layers that need ablation. Note, underlying layers that need ablation will consequently have the outermost layers ablated as well. If yes then method 200 proceeds to step 220. If not, then method 200 ends.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of selecting composite sheet materials for use in ultra-fast laser patterning and of patterning of one or more layers of a multi-layered thin structure, comprising:
    measuring each layer's absorption spectrum;
    making a comparison between absorption spectra of an upper layer and absorption spectra of its respective underlying layers;
    determining if the upper layer is ablatable without damage to its respective underlying layers based on the comparison;
    performing an examination of each layer's thermal, strength, and absorption spectra;
    deriving appropriate wavelength ($\lambda$), pulse width ($\tau$), spectral width ($\Delta\lambda$), spot size, bite size, and fluence based on the examination; and
    using an ultra-fast laser programmed with the appropriate wavelength ($\lambda$), pulse width ($\tau$), spectral width ($\Delta\lambda$), spot size, bite size, and fluence to pattern said one or more layers.

2. The method of claim 1, further comprising:
    defining $\lambda$ as the laser beam wavelength;
    defining $\tau$ as the temporal extent of a single laser pulse;
    defining $\Delta\lambda$ as a measure of the wavelength extent of a spectrum;
    defining spot size as the laser beam's diameter on target;
    defining bite size as a distance increment of the laser's strike points in between adjacent pulses; and defining fluence as the laser's pulse energy per unit area delivered on target.

3. The method of claim 2, further comprising:
measuring λ in nanometers (nm);
measuring τ in pico-seconds (ps);
measuring spot size in microns (μm);
measuring bite size in microns (μm); and
measuring fluence in Joules per square centimeter(J/cm$^2$).

4. The method of claim 1, wherein measuring each layer's absorption spectrum includes determining pass through energy transmitted through a layer to respective underlying layers.

5. The method of claim 1, further comprising examining each layer's thermal and chemical characteristics, wherein determining if the upper layer is ablatable without damage to its respective underlying layers includes giving consideration to thermal and chemical characterisitics of the upper layer and its respective underlying layers.

6. The method of claim 1, examining each layer's thermal and chemical characteristics includes retrieving each layer's melting point, thermal conductivity, and bonding strength to the underlying layer from a datastore, and wherein determining whether the upper layer is ablatable without damage to its respective underlying layers includes considering bonding strengths of respective upper layers to respective underlying layers, and considering melting points and thermal conductivities of layers.

7. The method of claim 6, wherein considering each layer's absorption spectrum includes:
comparing absorption spectra of the layers;
determining whether peaks of the absorption spectra overlap;
comparing absorption strength of an uppermost layer and its respective underlying layers, wherein the uppermost layer is the layer to be ablated; and
determining that the layer is ablatable without damage to its respective underlying layers only if a peak of its absorption spectrum does not overlap with peaks of absorption spectra of the underlying layers unless the upper layer's absorption strength is 100% higher than an underlying layer having an overlapping peak and thermal and bonding properties are not dramatically detrimental.

8. The method of claim 7, further comprising determining whether thermal and bonding properties are dramatically detrimental based on whether the thermal conductivity of the uppermost layer is within a factor of 100 compared to the underlying layer, assuming the conductivity of the uppermost layer is greater.

9. The method of claim 8, wherein determining whether thermal and bonding properties are dramatically detrimental is further based on whether a melting point of the uppermost layer is within a differential of 500° C. compared to the underlying layer, assuming the melting point of the underlying layer is lesser.

10. The method of claim 9, further comprising requiring a 10 times higher thermal conductivity and/or 500° C. higher melting point for the underlying layer than the uppermost layer when the absorption strengths are within 30% of each other.

11. The method of claim 7, further comprising determining whether thermal and bonding properties are dramatically detrimental based on whether a melting point of the uppermost layer is within a differential of 500° C. compared to the underlying layer, assuming the melting point of the underlying layer is lesser.

12. The method of claim 1, further comprising optimizing selection of material if the layer is not ablatable by researching and selecting alternate material such that a multi-layered structure can be redesigned for favorable ablation of the layer without damage to underlying layers.

13. The method of claim 12, wherein researching alternate material includes determining function of a layer to be replaced, including categorizing the layer as a passivation layer or a conductive layer.

14. The method of claim 13, wherein researching alternate material includes accessing material types that match the function of the layer, including accessing recorded thermal conductivity, melting point, and bonding strength data of the material types.

15. The method of claim 14, wherein researching alternate material includes comparing characteristics of each material type against characteristics of an underlying layer, including calculating and considering ratios of absorption strength, thermal conductivity, and difference in melting point to select a material of the upper layer of the multi-layered structure that allows ablation without damage to an underlying layer.

16. The method of claim 15, wherein researching alternate material includes repeating assessment against other layers in the multi-layered structure to ensure all underlying layers remain intact upon ablation.

17. The method of claim 16, wherein selecting alternate material includes selecting a material that ensures all underlying layers remain intact upon ablation.

18. The method of claim 17, further comprising storing a material choice for a given layer for future reference, including storing material type, absorption spectrum, and thermal and chemical characteristics.

19. A multilayer structure designed according to the method of claim 12.

20. The method of claim 1, further comprising determining a laser setup.

21. A laser having a laser setup determined according to the method of claim 20.

22. The method of claim 1, wherein determining the laser setup includes selecting operating parameters for the ablating laser using each layer's thermal, strength, rigidity and absorption spectrum characteristics.

23. The method of claim 22, further comprising setting the laser's appropriate λ, τ, Δλ, spot size, bite size, and fluence, all derived from examining each layer's thermal, strength and absorption spectra.

24. The method of claim 23, further comprising empirically choosing a proper power level for the ablating laser.

25. The method of claim 24, further comprising adjusting the power level to achieve maximal processing speed for a given allowable bite size without destroying a substrate.

26. The method of claim 25, further comprising repeatedly adjusting the power level for each layer to be ablated.

27. The method of claim 23, further comprising using a broadband tunable source to adjust the λ to achieve a desired absorption strength difference at a specific layer interface sequentially and individually.

28. The method of claim 1, further comprising patterning the layer through laser ablation processing.

29. The method of claim 28, wherein patterning the layer through laser ablation processing includes patterning a two-layer polyvinylphenol/plastic material.

30. The method of claim 29, wherein patterning the two-layer polyvinylphenol/plastic material includes ablating the material at $\tau \leq 20$ ps, $\lambda = 263$ nm, spot size $\leq 2$ μm, fluence=0.05-0.5 J/cm$^2$, and bite size $\leq 50\%$ of spot size.

31. The method of claim 28, wherein patterning the layer through laser ablation processing includes patterning a polyvinylphenol/glass layered material.

32. The method of claim 31, wherein patterning the layer through laser ablation processing includes patterning a polyvinylphenol/indium tin oxide (ITO) layered material.

33. The method of claim 32, wherein patterning the polyvinylphenol/indium tin oxide (ITO) layered material includes ablating the material at $\tau \geq 20$ ps, $\lambda = 263$ nm, spot size $\leq 2$ μm and bite size $\leq 50\%$ of spot size.

34. The method of claim 33, wherein patterning the polyvinylphenol/indium tin oxide (ITO) layered material includes ablating the material at fluence $\geq 1.5$ J/cm$^2$ for ablating both layers.

35. The method of claim 33, wherein patterning the polyvinylphenol/indium tin oxide (ITO) layered material includes ablating the material at fluence $\leq 0.5$ J/cm$^2$ for ablating the polyvinylphenol layer only.

36. The method of claim 32, wherein patterning the polyvinylphenol/indium tin oxide (ITO) layered material includes ablating the material at $\lambda = 263$ nm, spot size=2 μm, bite size $\leq 25\%$ of spot size.

37. The method of claim 28, wherein patterning the layer through laser ablation processing includes patterning a polyvinylphenol/gold (Au)/plastic layered material.

38. The method of claim 37, wherein patterning the polyvinylphenol/gold (Au)/plastic layered material includes ablating the material at fluence=0.05-0.3 J/cm$^2$.

39. The method of claim 28, further comprising determining if more layers need to be ablated.

40. A laser milled workpiece produced according to the method of claim 28.

* * * * *